Oct. 9, 1951 — L. W. VINAL — 2,570,613
DEGATING DEVICE FOR PLASTIC MOLDS
Filed July 8, 1948 — 2 Sheets-Sheet 1

INVENTOR.
LEROY W. VINAL
BY
Charles R. Fay, atty.

Oct. 9, 1951   L. W. VINAL   2,570,613
DEGATING DEVICE FOR PLASTIC MOLDS
Filed July 8, 1948   2 Sheets-Sheet 2

INVENTOR.
LEROY W. VINAL
BY
Charles R. Jay, atty.

Patented Oct. 9, 1951

2,570,613

UNITED STATES PATENT OFFICE 2,570,613

DEGATING DEVICE FOR PLASTIC MOLDS

Leroy W. Vinal, Leominster, Mass., assignor to E. I. du Pont de Nemours & Company, Wilmington, Del., a corporation of Delaware Application July 8, 1948, Serial No. 37,722

4 Claims. (Cl. 18—42)

This invention relates to improvements in degating devices contained wholly within the mold itself and operable upon opening the mold to separate the gate or sprue from the molded article so that the latter is removed in complete salable condition with no further operation necessary.

The principal object of the invention resides in the provision of a degating device as above stated which is simple in construction and positive in operation; the provision of a degating device automatically operable upon slight opening of the mold after the molding operation so that the sprue and article may be ejected separately by the usual ejector pins without interference therewith; and the provision of relatively moving mold cavity parts and a stripper blade or punch located at the sprue to strip or punch the latter cleanly from the molded article just as the mold opens in the usual molding cycle.

Another object of the invention resides in the provision of a molding cavity part having a spring to thrust the same out of the platen as the mold opens, and a sprue stripper or punch on the opposite platen of the mold also having a spring to thrust the same out, but in the opposite direction, the stripper or punch not interfering in any way with the spring pressed molding part and merely separating the sprue from the molded article at the initiation of the opening cycle of the molding machine.

My invention further relates to arrangements and combinations of parts which will be hereinafter described and more particularly pointed out in the appended claims.

Reference is to be had to the accompanying drawings, in which.

Figure 1:
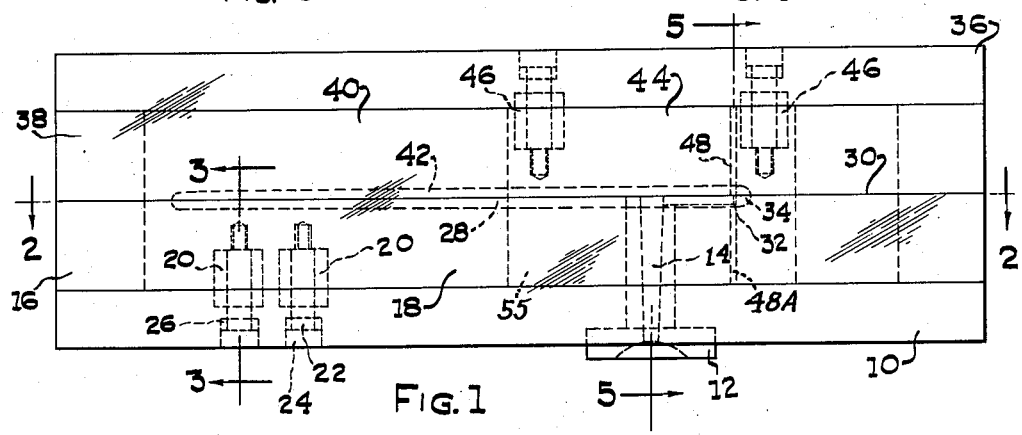
Fig. 1 is a diagrammatic representation of a mold according to the invention.

In Fig. 1 of the drawings, the plate adjacent the injection nozzle of the molding machine is indicated at 10 and this plate is provided with a bushing 12 to receive the nozzle and forming the sprue, indicated at 14. There are usually a plurality of plates making up a mold, but herein it is necessary merely to show four plates, one of which has been described.

The next plate is a molding plate indicated at 16, this plate being fixed to plate 10 and containing a cavity part 18 "floating" therein on springs 20 arranged on studs 22 threaded into the floating part 18 and provided with heads 24 limiting the travel of part 18 relative to plate 10 by contact with the bottoms of holes 26 in plate 10 accommodating the stud heads.

For purposes of illustrating the invention, a comb mold is disclosed, in a single place mold; however, any article may be made according to the invention, in molds of any desired number of places. The comb cavity in part 18 is shown at 28 and the parting line is at 30, Figs. 1 and 5. The gate is illustrated at 32, at the inside edge of a tooth 34 of the comb.

The other side of the mold comprises plate 36 to which is secured molding plate 38, the latter having a fixed molding part 40 provided with a cavity 42 complementary to cavity 28 and completing the same.

Figure 3:
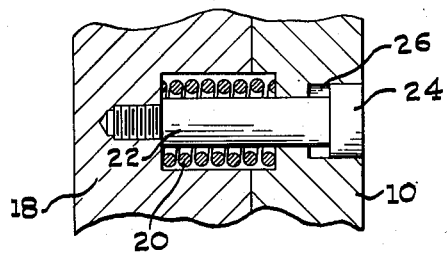
Fig. 3 is an enlarged section on line 3—3 of Fig. 1, showing a spring in compressed condition, with the mold closed.
Figure 4:
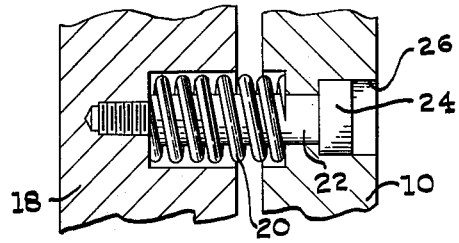
Fig. 4 is a view similar to Fig. 3 but showing the spring with the mold open.

Plate 38 also contains a block 44 floating therein by spring means 46 similar to those at 20 and as detailed in Figs. 3 and 4. Thus as mold part 18 tends to be pressed toward plate 38, block 44 tends to be pressed toward plate 16. Block 44 is the stripping block and fixed therein is a stripper blade or punch 48 held in a slot in block 44 by pins 50.

Figure 2:
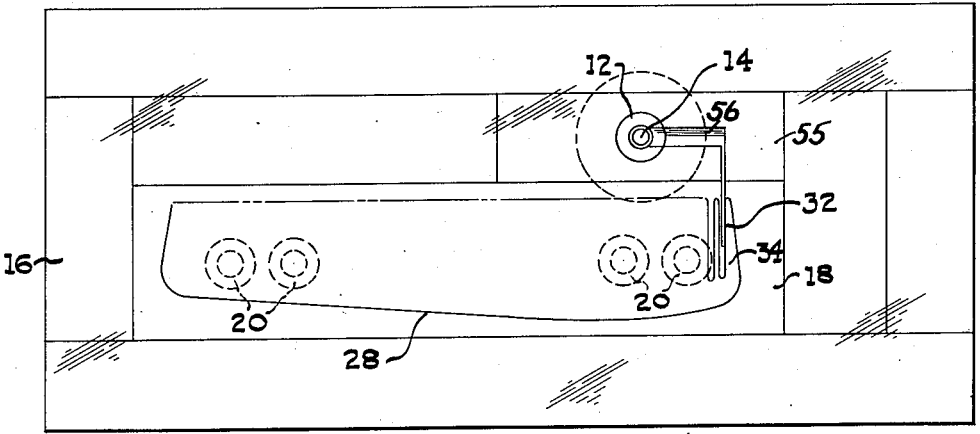
Fig. 2 is a view taken on line 2—2 of Fig. 1, and showing the location of the sprue in the mold.
Figure 6:
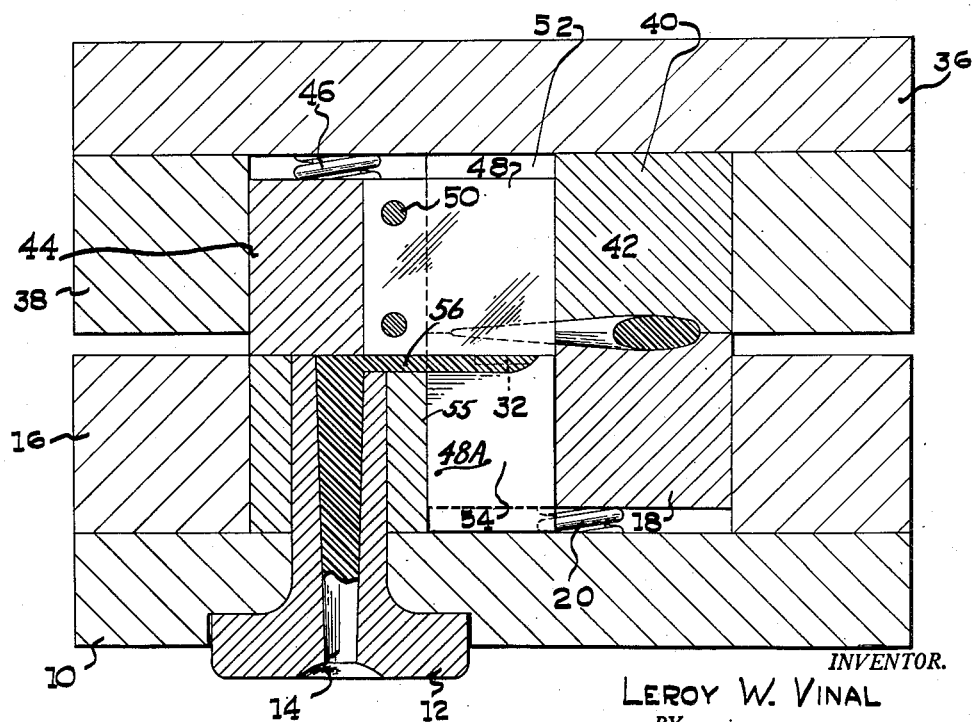
Fig. 6 is a view similar to Fig. 5 but showing the sprue stripping action as the initial opening of the mold takes place.

Blade or punch 48 extends over and beyond gate 32 and actually, in this case, forms a part of the mold defining the sprue. The blade or punch 48 lies in a closely engaging slot in molding part 40, this slot being indicated at 52 in Fig. 6. Upon relative movement of the molded article and the block 44 and blade or punch 48, the operating edge of the latter enters a like and aligned slot 54 in part 18, see Fig. 6. Block 55 is rigidly mounted on plate 10 and with blade 48a pinned to it forms the runner 56 and gate 32. Blade 48a moves in slot 54 and remains in contact with blade 48 until the position shown in Fig. 6 is reached. Looking at Fig. 2, the blade or punch 48 overlies gate 32 and is greater edgewise than the sprue to insure complete removal of the latter.

Figure 5:
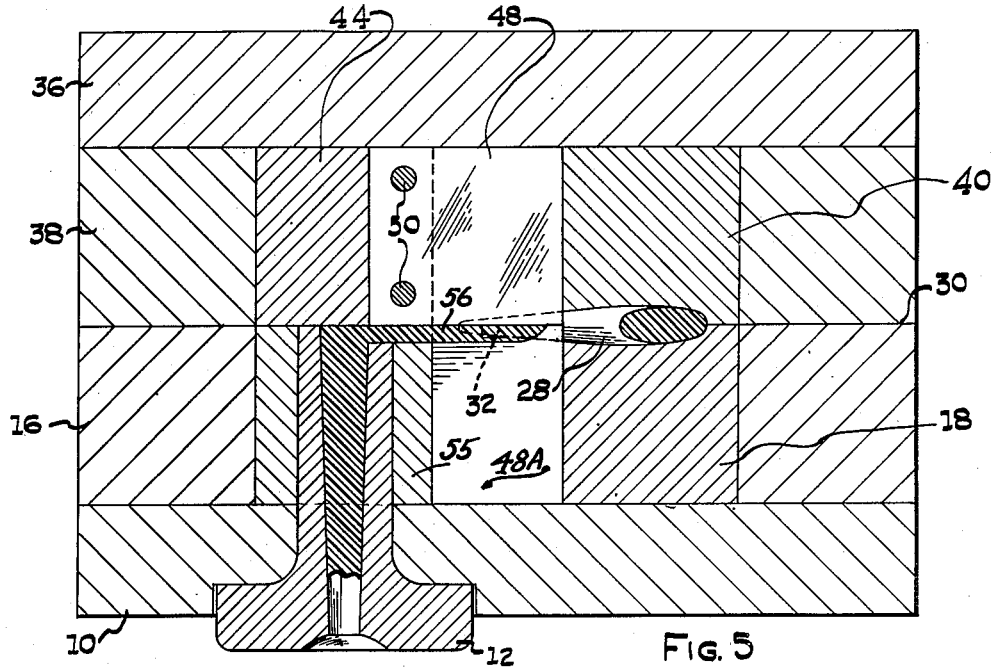
Fig. 5 is an enlarged section on line 5—5 of Fig. 1, and showing the parts, molded article, etc., as they appear after molding but prior to the opening of the mold.

As the plates start to open after molding, springs 20 urge molding part 18 outwards, to follow retreating plate 38, while springs 46 cause block 44 to remain behind, in contact with plate 16. That is, blade 48 opposes blade 48a, the latter being shaped as shown in Figs. 5 and 6 to form the gate 32 and runner 56 and to back up the same as the comb advances to leave the sprue and runner behind sheared off. Thus blade or punch 48 strips the sprue 32 from the article in the cavity and the article is degated and finished.

The limit of movement of parts 18 and 44 is shown in Fig. 6. As plate 36 retreats still further, the mold opens completely and the usual ejecting pins come into operation, as usual, to eject the sprue and molded article.

Having thus described my invention and the advantages thereof, I do not wish to be limited to the details herein disclosed, otherwise than as set forth in the claims, but what I claim is:

1. A mold comprising two main plates adapted to be opened and closed for the molding cycle, a floating cavity plate on one of the main plates, a relatively fixed complementary cavity plate on the other main plate, a floating stripper block on the latter plate, and means for the floating plate and block to thrust the same outwardly of their respective main plates as the latter open, thereby achieving a relative motion of the stripper block past the molded article, a sprue cavity, and a sprue stripping blade on the block, said blade overlying the sprue cavity.

2. A degating mold comprising a pair of main plates for advance and retraction during the molding cycle, a molding plate on each main plate, a floating cavity plate in one molding plate, resilient means tending to thrust the floating cavity plate outwardly of its molding plate, a fixed complementary cavity plate in the other molding plate, a floating stripper block in the latter plate, resilient means tending to thrust the stripper block outwardly thereof in a direction opposite to the floating cavity plate, the respective molding plates acting to thrust the floating plate and block back inwardly as the mold closes, a sprue cavity, and a stripper blade on the block in position to strip the sprue from the article being molded, as the mold opens.

3. The mold of claim 2 wherein the stripper blade overlies the sprue and forms a wall of the sprue cavity when the mold is closed.

4. The mold of claim 2 including means limiting the motion of the floating plate and block.

LEROY W. VINAL.

REFERENCES CITED

The following references are of record in the file of this patent:

UNITED STATES PATENTS

| Number | Name | Date |
| --- | --- | --- |
| 1,029,488 | Burghoff et al. | June 11, 1912 |
| 1,863,304 | Graves | June 14, 1932 |
| 2,353,825 | Hofmann | June 13, 1944 |
| 2,408,629 | Green | Oct. 1, 1946 |
| 2,411,176 | Wessel | Nov. 19, 1946 |
| 2,457,336 | Wilson | Dec. 28, 1948 |

FOREIGN PATENTS

| Number | Country | Date |
| --- | --- | --- |
| 870,712 | France | Dec. 22, 1941 |
| 871,956 | France | Jan. 29, 1942 |